US011946696B2

(12) United States Patent
Wei (10) Patent No.: US 11,946,696 B2
(45) Date of Patent: Apr. 2, 2024

(54) END BARRIER BOX AND A REFLOW OVEN USING THE END BARRIER BOX (71) Applicant: Illinois Tool Works Inc., Glenview, IL (US)

(72) Inventor: Daopeng Wei, Suzhou New District (CN)

(73) Assignee: Illinois Tool Works Inc., Glenview, IL (US)

( * ) Notice: Subject to any disclaimer, the term of this patent is extended or adjusted under 35 U.S.C. 154(b) by 586 days.

(21) Appl. No.: 17/256,474

(22) PCT Filed: Jun. 25, 2019

(86) PCT No.: PCT/US2019/038922
§ 371 (c)(1),
(2) Date: Dec. 28, 2020

(87) PCT Pub. No.: WO2020/005900
PCT Pub. Date: Jan. 2, 2020

(65) Prior Publication Data
US 2021/0372701 A1 Dec. 2, 2021

(30) Foreign Application Priority Data
Jun. 27, 2018 (CN) .......................... 201810680383.X (51) Int. Cl.
*F27B 9/30* (2006.01)
*B23K 1/008* (2006.01)
(Continued)

(52) U.S. Cl.
CPC ............ *F27B 9/3011* (2013.01); *B23K 1/008* (2013.01); *B23K 3/08* (2013.01); *F27D 99/0075* (2013.01); *F27D 99/0076* (2013.01)

(58) Field of Classification Search
CPC .......... B23K 1/012; B23K 1/008; B23K 3/08; F27B 9/3011; F27D 99/0075; F27D 99/0076; F27D 2099/008
See application file for complete search history.

(56) References Cited

U.S. PATENT DOCUMENTS 5,623,829 A * 4/1997 Nutter .................... B23K 1/008
62/266
5,715,990 A 2/1998 Taniguchi et al.
(Continued)

FOREIGN PATENT DOCUMENTS

CN 1665632 9/2005
CN 201222773 4/2009
(Continued)

OTHER PUBLICATIONS

European Office Communication Appln No. 19740448.6 dated Oct. 6, 2022.
(Continued)

*Primary Examiner* — Gregory A Wilson
(74) *Attorney, Agent, or Firm* — McAndrews, Held & Malloy, Ltd.

(57) ABSTRACT

The present application discloses an end barrier box for blocking ambient gases from entering a hearth of a reflow oven, including: a box body, wherein the box body includes a bottom and a top, the bottom has a mounting bottom plate, the top has an opening, the box body further includes a pair of side walls, and the side walls are oppositely disposed; and a plurality of deflectors, wherein each of the plurality of deflectors is mounted between the pair of side walls, each of the plurality of deflectors includes at least three fins, and the at least three fins are mounted on the mounting bottom plate and extend upward from the mounting bottom plate. According to the end barrier box of the present application, the deflector is set to include at least three fins, so that the
(Continued)

deflector can be easily disassembled without disassembling the rails, which is convenient for cleaning and maintenance of the end barrier box.

19 Claims, 5 Drawing Sheets

(51) Int. Cl.
*B23K 3/08* (2006.01)
*F27D 99/00* (2010.01)

(56) References Cited

U.S. PATENT DOCUMENTS

| | | | |
|---|---|---|---|
| 6,694,637 B2* | 2/2004 | Miller, Jr. | B23K 1/008 |
| | | | 34/79 |
| 6,780,225 B2* | 8/2004 | Shaw | B23K 1/012 |
| | | | 228/43 |
| 8,110,015 B2* | 2/2012 | Neiderman | B23K 1/008 |
| | | | 95/288 |
| 2021/0180867 A1* | 6/2021 | Wang | F27D 21/04 |
| 2023/0147071 A1* | 5/2023 | Endreß | B23K 1/20 |
| | | | 228/6.2 |

FOREIGN PATENT DOCUMENTS

| | | | | |
|---|---|---|---|---|
| CN | 201979185 | | 9/2011 | |
| CN | 102860145 | | 1/2013 | |
| CN | 107388345 | | 11/2017 | |
| CN | 113458525 A | * | 10/2021 | |
| CN | 115673459 A | * | 2/2023 | |
| GB | 2410202 A | * | 7/2005 | B01D 46/02 |
| JP | H05208261 | | 8/1993 | |
| JP | 2006185983 | | 7/2006 | |
| JP | 2007012926 | | 1/2007 | |

OTHER PUBLICATIONS

Int'l Search Report and Written Opinion Appln No. PCT/US2019/038922 dated Aug. 20, 2019.
Japanese Office Action Appln No. 2020-572762 dated Jun. 29, 2023.

* cited by examiner

END BARRIER BOX AND A REFLOW OVEN USING THE END BARRIER BOX

CROSS-REFERENCE TO RELATED APPLICATIONS

The present application is a national stage application under 35 U.S.C. § 371 of PCT Application Serial No. PCT/US2019/038922, filed on Jun. 25, 2019, and entitled "AN END BARRIER BOX AND A REFLOW OVEN USING THE END BARRIER BOX," and claims priority to Chinese Patent Application No. 201810680383.X, filed Jun. 27, 2018, and entitled "AN END BARRIER BOX AND A REFLOW OVEN USING THE END BARRIER BOX." The entireties of PCT Application Serial No. PCT/US2019/038922 and Chinese Patent Application No. 201810680383.X are incorporated herein by reference.

FIELD OF THE INVENTION

The present application relates to a reflow oven and an end barrier box used at an inlet end and an outlet end of the reflow oven.

BACKGROUND OF THE INVENTION

For a reflow oven that uses an inert gas as the working gas, if air from the external environment enters the hearth, the inert atmosphere in the hearth will be destroyed, resulting in difficulty in controlling the ratio of inert gas to oxygen gas and the gas temperature in the furnace. Therefore, the top and the bottom of the inlet end and the outlet end of the reflow oven are respectively provided with end barrier boxes with opposite openings, wherein the end barrier box at the bottom is located below the workpiece delivery guide rail of the reflow oven. The inert gas delivered into the barrier box can form a barrier region between the top and bottom end barrier boxes, thereby reducing air from the external environment going into the hearth of the reflow oven by means of a gas curtain.

However, during use of the end barrier box, the gas in the hearth of the reflow oven contacts the end barrier box, such that volatile contaminants in these gases form condensate on the internal components of the end barrier box. Therefore, it is necessary to provide an end barrier box that is convenient for cleaning and maintenance.

SUMMARY OF THE INVENTION

In order to solve the above problems, an object of the present application is to provide an end barrier box which is convenient for disassembly and cleaning.

In order to achieve the above object, a first aspect of the present application provides an end barrier box for blocking ambient gases from entering the hearth of a reflow oven, including: a box body, wherein the box body includes a bottom, the bottom has a mounting bottom plate, the box body forms a top opening, and the box body further includes a pair of side walls, and the side walls are oppositely disposed; and a plurality of deflectors, wherein each of the plurality of deflectors is mounted between the pair of side walls, each of the plurality of deflectors includes at least three fins, and the at least three fins are mounted on the mounting bottom plate and extend upward from the mounting bottom plate.

According to the first aspect described above, the end barrier box is to be installed below at least two guide rails of the reflow oven, and a first width is included between the adjacent guide rails of the at least two guide rails; a second width is included between one guide rail of the at least two guide rails and the corresponding side wall; a third width is included between the other guide rail of the at least two guide rails and the corresponding side wall; and at least one fin of the at least three fins has a width smaller than at least one width of the first width, the second width and the third width such that at least one fin of the at least three fins is removable from the top opening. At least one fin of the at least three fins is removable between the adjacent guide rails of the at least two guide rails, between one guide rail of the at least two guide rails and the corresponding side wall, or between the other guide rail of the at least two guide rails and the corresponding side wall.

According to the first aspect described above, a width of the plurality of deflectors is the same as a width between the pair of side walls.

According to the first aspect described above, the at least three fins are four fins.

According to the first aspect described above, a gap is formed between the adjacent deflectors of the plurality of deflectors to form a gas passage.

According to the first aspect described above, the mounting bottom plate is provided with a plurality of vent holes, and the plurality of vent holes are in communication with the gas passage.

According to the first aspect described above, each of the fins includes a bent portion, and the bent portion is connected to the mounting bottom plate by a removable fastening assembly such that the at least three fins are mounted on the mounting bottom plate.

According to the first aspect described above, the removable fastening assembly includes: an insert member, wherein the insert member is mounted on the bent portion, the insert member includes a U-shaped frame and a bolt, the bent portion has a hole, two ends of the U-shaped frame are mounted at two ends of the hole, and the bolt is mounted on a top of the U-shaped frame and has a tongue extending toward a direction of the hole; and a receiving member, wherein the receiving member is mounted on the mounting bottom plate, the receiving member includes a boss, the boss is provided with a receiving slot, and the boss is used for passing through the hole such that the receiving slot receives the tongue of the bolt.

According to the first aspect described above, the receiving member includes an elastic member and a ball, the ball is disposed at one end of the elastic member, the elastic member and the ball are disposed on two sides of the receiving slot, and the ball is used for elastic contact with a side surface of the tongue.

A second aspect of the present application provides a reflow oven, including: at least two guide rails; and the above end barrier box disposed at an inlet end and an outlet end of the reflow oven, wherein the end barrier box is disposed below the at least two guide rails.

According to the end barrier box of the present application, the deflector is set to include at least three fins, so that the deflector can be easily disassembled without disassembling the rails, which is convenient for cleaning and maintenance of the end barrier box.

DETAILED DESCRIPTION OF THE INVENTION

Various specific embodiments of the present application will be described below with reference to the drawings which form a part of this specification. It should be understood that although terms referring to directions, such as "front", "rear", "upper", "lower", "left", "right", "top", "bottom", etc., are used in the present application to describe various exemplary structural parts and elements of the present application, these terms are used herein for illustrative purposes only, and are based on the exemplary orientations shown in the drawings. Since the embodiments disclosed in the present application may be arranged in different directions, these terms are merely illustrative and are not to be considered as limiting. Wherever possible, the same or similar reference numerals used in the present application are used to refer to the same components.

Figure 1:
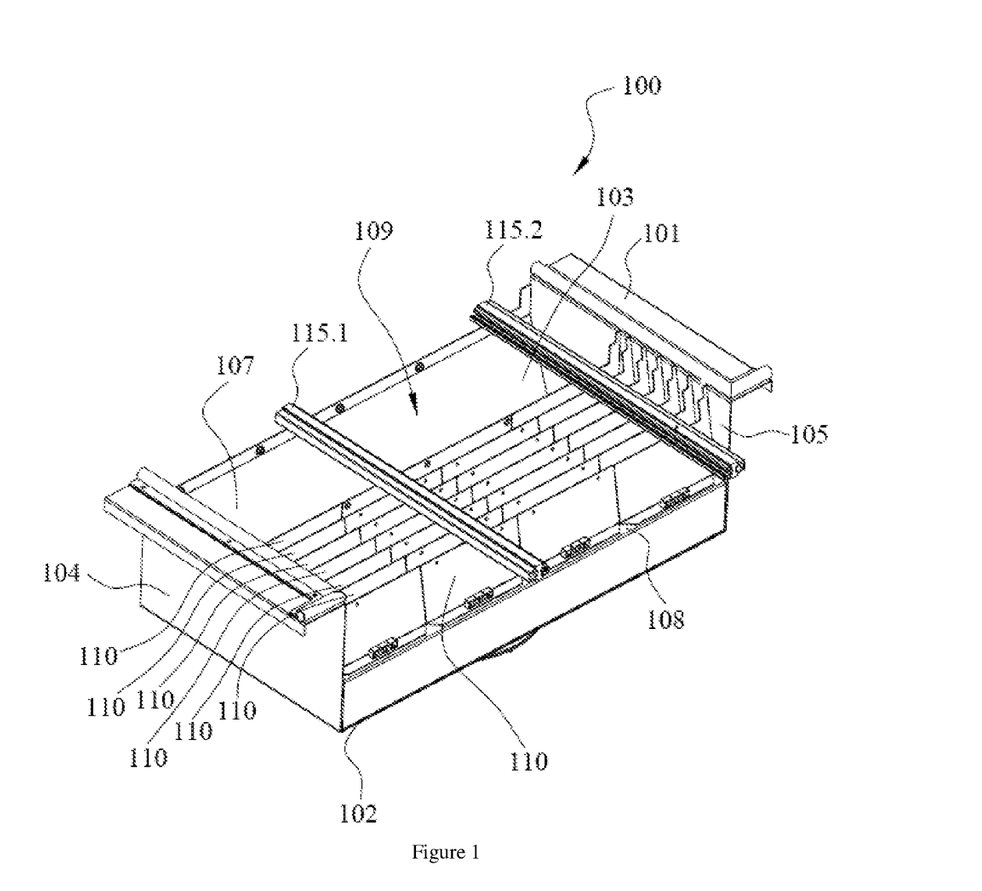
FIG. 1 is a three-dimensional structural view of an end barrier box of the present application after being assembled with the guide rails.

FIG. 1 is a three-dimensional structural view of an end barrier box 100 of the present application when assembled below guide rails of the reflow oven, for illustrating the positional relationship between the end barrier box 100 and the guide rails, and the outer structure of the end barrier box 100. As shown in FIG. 1, the end barrier box 100 is located below the two guide rails 115.1 and 115.2 in the reflow oven. Here, in order to more clearly show the end barrier box 100, only a small section of the guide rails 115.1 and 115.2 above the end barrier box 100 is shown in FIG. 1.

As shown in FIG. 1, the end barrier box 100 includes a box body 101, and the box body 101 comprises a top 103, a bottom 102, and side walls 104, 105. The top 103 of the box body 101 forms a top opening 109, and the bottom 102 has a mounting bottom plate 108. The side walls 104 and 105 are located on the left and right sides of the box body 101 and are oppositely disposed. The rear side of the box body 101 has a baffle 107, wherein the front side of the box body 101 is in communication with the reflow oven. The guide rails 115.1 and 115.2 are supported by the baffle 107 at one end, extend in a direction substantially parallel to the side walls 104 and 105 to pass through the hearth of the reflow oven, and are used to transport workpieces to be welded along the front-rear direction of the end barrier box 100.

The end barrier box 100 further includes a plurality of deflectors 110. Each of the deflectors 110 is disposed between the side walls 104 and 105 and extends from one side wall 104 to the other side wall 105. Each of the deflectors 110 is mounted on the mounting bottom plate 108 and extends upward from the mounting bottom plate 108. These deflectors 110 are arranged side by side and in parallel with each other. The guide rails 115.1 and 115.2 are located above the plurality of deflectors 110.

Of course, it will be appreciated by those skilled in the art that an end barrier box corresponding to the end barrier box 100 is also assembled above the guide rails 115.1 and 115.2. The end barrier box above the guide rails also has an opening and deflectors, wherein the opening of the end barrier box above the guide rails is disposed in a downward manner. Such a pair of end barrier boxes are provided at both the inlet end and the outlet end of the reflow oven hearth. Thus, when gas is simultaneously introduced into the end barrier boxes above and below the guide rails 115.1 and 115.2, the external ambient gas at both ends of the reflow oven hearth and the internal gas in the reflow oven hearth can be blocked near the guide rails 115.1 and 115.2 between the two end barrier boxes. The end barrier box above the guide rails may have the same structure as the end barrier box 100, or may be any existing end barrier box.

Figure 2A:
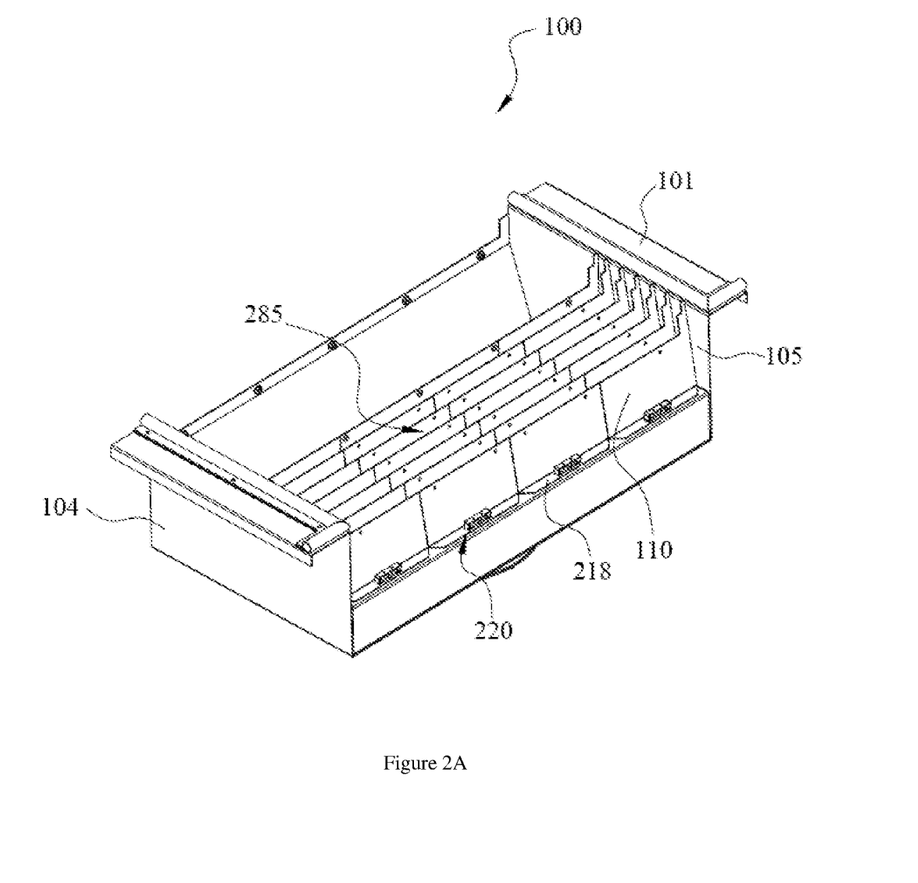
FIG. 2A is a three-dimensional structural view of the end barrier box of the present application.
Figure 2B:
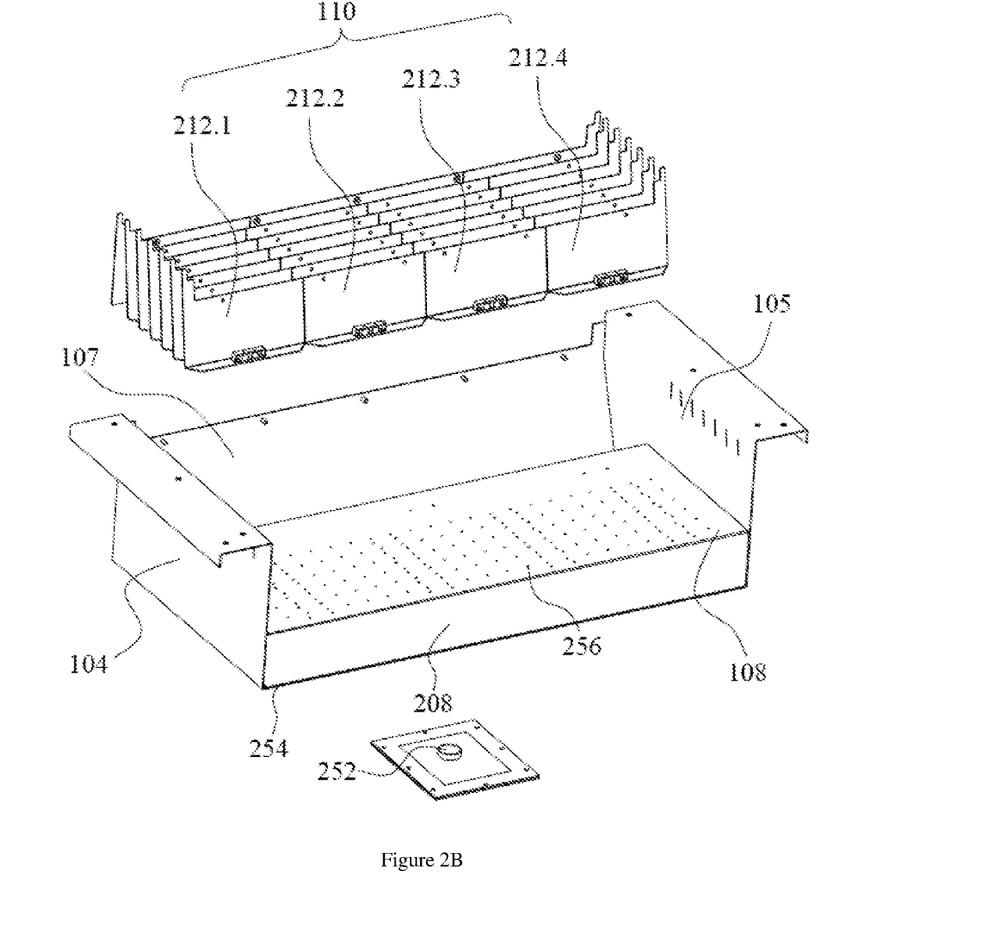
FIG. 2B is an exploded three-dimensional structural view of the end barrier box shown in FIG. 2A for illustrating a specific structure of the mounting bottom plate.

The specific structure of the end barrier box 100 is further shown in FIG. 2A and FIG. 2B, wherein FIG. 2B is an exploded three-dimensional structural view of the end barrier box 100 of FIG. 2A.

As shown in FIG. 2A and FIG. 2B, the bottom 102 of the end barrier box 100 further includes a bottom plate 254 and a front side plate 208. The bottom plate 254, the front side plate 208, the mounting bottom plate 108, the side walls 104, 105 and the baffle 107 jointly form a gas cavity at the bottom 102 of the end barrier box 100. The bottom plate 254 is provided with an opening (not shown) for connecting a gas input port 252. The gas input port 252 can be connected to a gas source, such as a nitrogen bottle, such that gas in the gas source is delivered through the gas input port 252 into the gas cavity of the end barrier box 100. The mounting bottom plate 108 is provided with a plurality of vent holes 256 for the passage of gas such that the gas in the gas cavity can be delivered through the vent holes 256 to above the mounting bottom plate 108.

A gap 285 is formed between the adjacent deflectors 110, and the gap 285 can form a gas passage. The vent holes 256 are disposed in the bottom plate 108 at a position corresponding to the gap 285 such that the gas in the gas cavity can enter the gas passage through the vent holes 256. The gas entering the gas passage can flow from bottom to top along the deflectors 110, thereby forming a barrier region of gas laminar flows above the deflectors 110. In an example of the present application, seven deflectors 110 are provided, forming six gas passages. Those skilled in the art may also provide more than seven or fewer than seven deflectors 110 according to different reflow ovens and welding product specification requirements, all of which are within the scope of the present application.

Each of the deflectors 110 includes four fins 212.1, 212.2, 212.3, 212.4, and the four fins are arranged side by side in a row along the width direction thereof to form the deflector 110. The bottom of each of the fins includes a bent portion 218, and the mounting bottom plate 108 and the bent portion 218 are connected by a fastening assembly 220 such that the fins can be connected to the mounting bottom plate 108.

As shown in FIG. 2A and FIG. 2B, each of the fins has a certain width in the direction from the side wall 104 to the side wall 105. The widths of the fins may be the same or different, but the sum of their widths is the same as the width W4 of the deflector 110 (referring to FIG. 3). Each of the fins has a certain height in the direction from the bottom 102 to the top opening 109. The heights of the fins may be the same or different, as long as each of the fins has a certain distance H from the guide rail (referring to FIG. 3).

Figure 3:
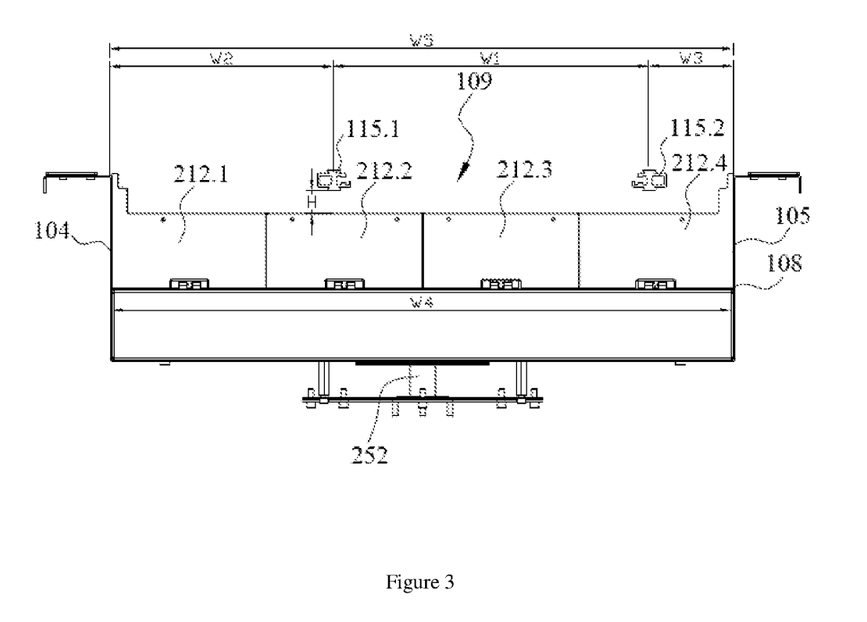
FIG. 3 is a front view of the end barrier box of FIG. 1 for illustrating the relationship between the distance between the guide rails, the distance between the guide rails and the side wall, and the width of the fins.

FIG. 3 is a front view of the end barrier box 100 of FIG. 1 assembled below the guide rails of the reflow oven for illustrating the size setting of the fins and the disassembly process of the fins.

As shown in FIG. 3, a width W1 is included between the guide rails 115.1 and 115.2 of the reflow oven, a width W2 is included between the guide rail 115.1 and the side wall 104, and a width W3 is included between the guide rail 115.2 and the side wall 105. As an example, W1, W2 and W3 are sequentially decreased. The sum of W1, W2, and W3 is substantially equal to a width W5 between the side walls 104 and 105. The width W4 of the deflector 110 composed of four fins 212.1, 212.2, 212.3, 212.4 is also substantially the same as W5.

In the example shown in FIG. 3 of the present application, each of the fins has a width that is substantially the same, which is less than W1 and W2, but greater than W3. The height of each of the fins is also approximately the same, and has a certain distance H from the guide rail. It should be noted that, in other embodiments, the widths of the fins may also be different, as long as a required number of fins are provided or fins having a certain width are provided such that at least one of the fins has a width smaller than any of W1, W2 and W3.

During use of the end barrier box 100, the high-temperature gas in the hearth of the reflow oven contacts the end barrier box, and the temperature of the gas in the barrier region of the end barrier box is lower, such that volatile contaminants in the gas from the hearth of the reflow oven will easily form condensate on the deflectors 110 and the mounting bottom plate 108 of the end barrier box 100. When the condensate on the deflectors 110 and the mounting bottom plate 108 accumulates to a certain extent, for example, affecting the flow of gas to form a barrier region, the deflector 110 needs to be disassembled from the end barrier box 100, so that the end barrier box 100 can be separately cleaned and the mounting bottom plate 108 can be conveniently cleaned. In the prior art, the deflector includes only one fin. Since the guide rails 115.1 and 115.2 block the fin from being taken out from above, when the fin is removed to clean the deflector and the mounting bottom plate, the guide rails 115.1 and 115.2 need to be removed first or the end barrier box needs to be removed as a whole.

In the present application, one deflector 110 is set to be spliced from four fins 212.1, 212.2, 212.3, 212.4, and a suitable fin width is set, so that the fins may be taken out through the gap between the adjacent guide rails or the gap between the guide rail and the side wall. The deflector 110 is not difficult to disassemble due to being blocked by the two guide rails 115.1, 115.2 of the reflow oven. Therefore, by using the end barrier box 100 provided by the present application, the deflector 110 can be conveniently disassembled without disassembling the guide rails, so as to facilitate the cleaning of the end barrier box.

The specific disassembly process of the deflector 110 will be described in detail below with reference to FIG. 3.

When the deflector 110 is disassembled, the fins 212.1 and 212.3 are first disassembled. Specifically, the fin 212.1 is enabled to pass through the gap between the guide rail 115.1 and the side wall 104, and the fin 212.1 is taken out from the opening 109 in an upward manner. The fin 212.3 is enabled to pass through the gap between the guide rail 115.1 and the guide rail 115.2, and the fin 212.3 is taken out from the opening 109 in an upward manner. Thereby, the fins 212.1 and 212.3 can be disassembled. Then, the fin 212.2 and the fin 212.4 are disassembled. The fin 212.2 and the fin 212.4 are first moved by a distance to the left or right such that the fin 212.2 and the fin 212.4 can pass through the gap between the guide rail 115.1 and the side wall 104 or the gap between the guide rail 115.1 and the guide rail 115.2 and are taken out from the opening 109 in an upward manner.

In some reflow ovens, the positions of the guide rails 115.1 and 115.2 may be adjustable such that the magnitude relationship of W1, W2, and W3 changes. At this time, it is also possible to specifically determine which fins are to be removed first depending on the magnitude of W1, W2 and W3, instead of being limited to the disassembly process of the fins of the deflector 110 shown in FIG. 3. As an example, when the guide rail 115.1 is moved to the left such that the width of the fin is smaller than W1 but larger than W2 and W3, the fins 212.2 and 212.3 may be disassembled first, and then the fins 212.1 and 212.4 may be disassembled after being moved to the middle.

It is to be noted that the number of fins divided from one deflector 110 is not limited to the number in the above example, but is determined according to the number of guide rails in the reflow oven and the position setting of the guide rails in the reflow oven. For example, when two guide rails are disposed in the reflow oven, one deflector 110 may also be spliced from three fins, as long as at least one fin has a width smaller than any of W1, W2 and W3. The deflector may also be composed of a greater number of fins, for example five, as long as at least one of the fins has a width smaller than any of W1, W2 and W3.

When the deflector 110 is mounted, the mounting process is the reverse of the disassembly process. In the example shown in FIG. 3, the fins 212.1 and 212.3 may be mounted after the fins 212.2 and 212.4 are mounted.

Figure 4A:
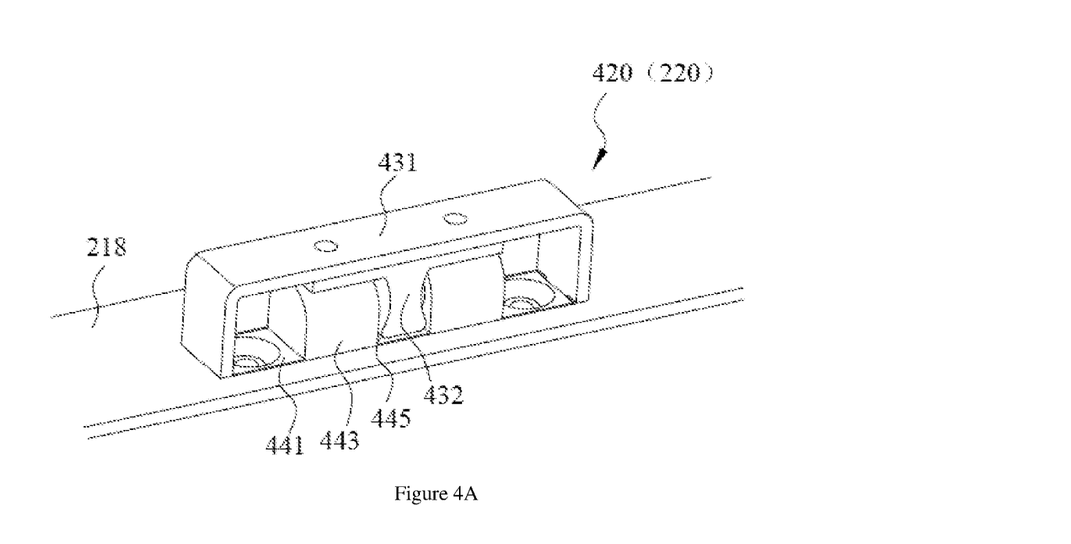
FIG. 4A is a three-dimensional structural view of an embodiment of a fastening assembly, in which the fastening assembly is in a connected state.
Figure 4B:
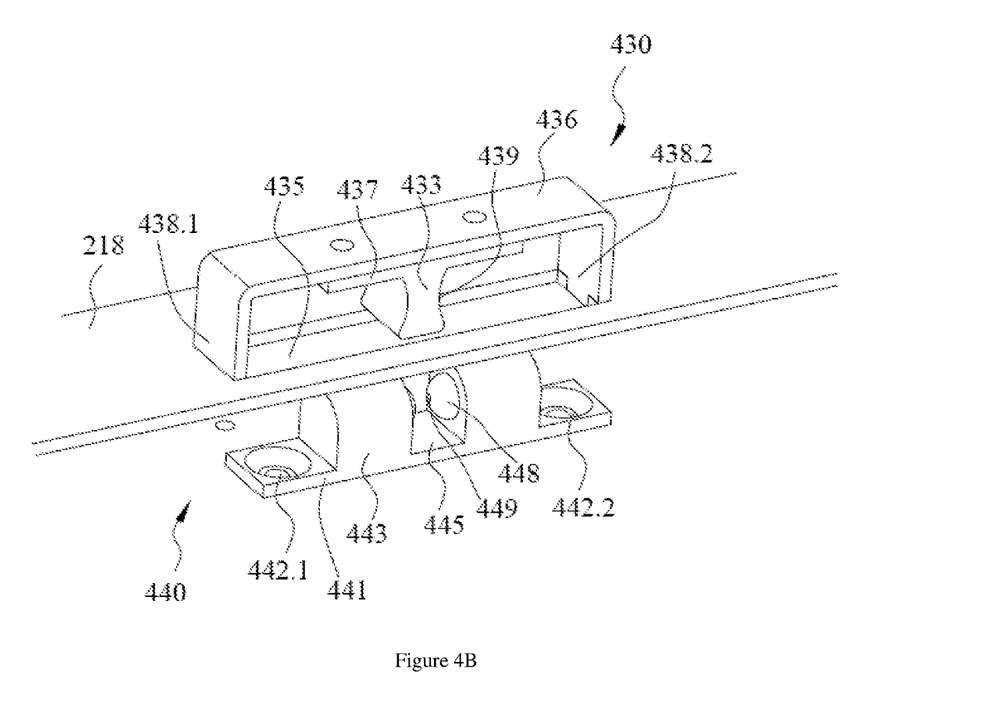
FIG. 4B is a three-dimensional structural view of an embodiment of a fastening assembly, in which the fastening assembly is in a disconnected state.

FIG. 4A and FIG. 4B show a specific structure of an embodiment of the fastening assembly 220 for illustrating a connection structure between the fins and the mounting bottom plate 108, wherein the fastening assembly 220 is a removable fastening assembly 420. The removable fastening assembly 420 in FIG. 4A is in a connected state, and the removable fastening assembly 420 in FIG. 4B is in a disconnected state. Moreover, in order to more clearly show the specific structure of the removable fastening assembly 420, only the bent portion 218 of the fin is shown in FIG. 4A and FIG. 4B, and the remaining portion of the fin is omitted. In other embodiments, the fastening assembly 220 may also be a fastening assembly of other structures.

As shown in FIG. 4A and FIG. 4B, the removable fastening assembly 420 includes an insert member 430 and a receiving member 440, wherein the insert member 430 is disposed on the bent portion 218 of the fin, and the receiving member 440 is mounted on the mounting bottom plate 108.

The insert member 430 includes a U-shaped frame 431 and a bolt 432. The bent portion 218 is provided with a hole 435, and the U-shaped frame 431 is connected to the upper surface of the bent portion 218 and spans the hole 435 in the left-right direction. The bolt 432 is mounted on the inner side of the U-shaped frame 431. Specifically, the U-shaped frame 431 has a top 436 and two ends 438.1 and 438.2, wherein the top 436 is kept at a certain distance from the hole 435, and the two ends 438.1 and 438.2 are respectively connected to the upper surfaces of the bent portions 218 at the left and right ends of the hole 435, so that the frame 431 is substantially in an inverted U shape. The bolt 432 is connected to the lower surface of the top 436 and located between the top 436 and the hole 435. The bolt 432 includes a base 437 and a tongue 433. The base 437 is connected to the lower surface of the U-shaped frame top 436, and the tongue 433 extends from the base 437 toward the hole 435. The left and right sides of the tongue 433 have a smooth curved surface 439 and are slightly inwardly recessed. In other examples, the insert member 430 may also have no base 437, and the tongue 433 is directly connected to the lower surface of the U-shaped frame top 436.

The receiving member 440 includes a pedestal 441 and a boss 443. The left and right ends of the pedestal 441 are provided with connecting holes 442.1 and 442.2, and the pedestal 441 can be connected to the mounting bottom plate 108 through the connecting holes 442.1 and 442.2. The middle of the pedestal 441 has a boss 443, the middle of the boss 443 is provided with a receiving slot 445, and the receiving slot 445 divides the boss 443 into two parts. The side walls on the left and right sides of the receiving slot 445 are respectively provided with an elastic member 448, and the two elastic members 448 are expandable and contractible in the left-right direction. A ball 449 is connected to the end of the elastic member 448. When the insert member 430 is connected to the receiving member 440, the tongue 433 of the bolt 432 is inserted into the receiving slot 445, and the base 437 of the bolt 432 abuts against the top surface of the boss 443. As an example, the top surface of the boss 443 is in the shape of a curved surface.

The mounting and disassembly process of the fins is further explained below in conjunction with FIG. 2A, FIG. 4A and FIG. 4B.

When the fins are mounted, the removable fastening assembly 420 undergoes the state from FIG. 4B to FIG. 4A to connect the fins to the mounting bottom plate 108 downwardly in the vertical direction. Specifically, when a downward pressure is applied to the fin, the receiving member 440 passes through the hole 435 upwardly. The size of the hole 435 is set to receive the pedestal 441 of the receiving member 440 and to match the size of the pedestal 441, so that after the pedestal 441 is received in the hole 435, the position of the receiving member 440 in the horizontal direction with respect to the insert member 430 is limited. The base 437 of the bolt 432 is in contact with the top surface of the boss 443, thereby also limiting the position of the receiving member 440 in the vertical direction relative to the insert member 430. When the tongue 433 of the insert member 430 is inserted into the receiving slot 445 of the receiving member 440, the elastic member 448 and the ball 449 elastically contact the curved surface 439 of the tongue 433 from the left and right sides, and maintain a certain tension, so that after the tongue 433 of the bolt 432 is inserted into the receiving slot 445, the elastic member 448 and the ball 449 abut against the recess of the curved surface 439. The elastic member 448 and the ball 449 do not move relative to the curved surface 439 without being subjected to an external force. Thereby the insert member 430 and the receiving member 440 can be connected together such that the fins are connected to the mounting bottom plate 108.

When the fins are disassembled, the removable fastening assembly 420 undergoes the state from FIG. 4A to FIG. 4B to pull out the fins from the mounting bottom plate 108 upwardly in the vertical direction. Specifically, when an upward pulling force is applied to the fin, the pulling force overcomes the elastic force of the elastic member 448 against the curved surface 439 such that the tongue 433 of the insert member 430 is disengaged from the receiving slot 445 of the receiving member 440, thereby disconnecting the insert member 430 and the receiving member 440 such that the fin is disassembled from the mounting bottom plate 108. As an example, before applying an upward pulling force to the fin, the fin is slightly deflected in the front-rear direction such that the curved surface portion of the top surface of the boss 443 is in contact with the base 437; and the insert member 430 is deflected at an angle by the curved surface portion of the top surface of the boss 443, the elastic member 448 and the ball 449 are thereby separated from the curved surface 439 by the deflecting action, and then a pulling force is applied to the fin to disassemble the fin. Thereby, the applied tensile force does not need to overcome the re-elastic force, so that the fin can be disassembled by applying a smaller pulling force.

Therefore, the mounting and disassembly of the fins can be made easier by the removable fastening assembly 420, and the fins can be mounted and disassembled more quickly in a smaller space without the need for an operating space for the screw mounting.

Although the present invention has been described with reference to the specific embodiments illustrated in the drawings, it is understood that the end barrier box of the present application can take many variations without departing from the spirit and scope and background of the present application. It will be appreciated by those skilled in the art that there are different ways to change the arrangements in the embodiments disclosed in the present application, which shall all fall within the spirit and scope of the present application and the claims.

What is claimed is:

1. An end barrier box for blocking ambient gases from entering a hearth of a reflow oven, comprising:
   a box body, wherein the box body comprises a bottom, the bottom has a mounting bottom plate, the box body forms a top opening, the box body further comprises a pair of side walls, and the side walls are oppositely disposed; and
   a plurality of deflectors, wherein each of the plurality of deflectors is mounted between the pair of side walls, each of the plurality of deflectors comprises at least three fins, and the at least three fins are mounted on the mounting bottom plate and extend upward from the mounting bottom plate, wherein adjacent ones of the plurality of deflectors are spaced apart to form gas flow passages,
   wherein the mounting bottom plate comprises a plurality of holes to allow fluid communication between the gas flow passages and a space between the mounting bottom plate and the bottom of the box body.

2. The end barrier box as claimed in claim 1, wherein the end barrier box is assembled below at least two guide rails of the reflow oven, and a first width is included between the adjacent guide rails of the at least two guide rails;
   a second width is included between one guide rail of the at least two guide rails and the corresponding side wall;
   a third width is included between the other guide rail of the at least two guide rails and the corresponding side wall; and
   at least one fin of the at least three fins has a width smaller than at least one width of the first width, the second width and the third width such that at least one fin of the at least three fins is removable from the top opening.

3. The end barrier box as claimed in claim 2, wherein:
   a width of the plurality of deflectors is the same as a width between the pair of side walls.

4. The end barrier box as claimed in claim 2, wherein:
   the at least three fins are four fins.

5. The end barrier box as claimed in claim 2, wherein:
   a gap is formed between the adjacent deflectors of the plurality of deflectors to form a gas passage.

6. The end barrier box as claimed in claim 5, wherein:
the mounting bottom plate is provided with a plurality of vent holes, and the plurality of vent holes are in communication with the gas passage.

7. The end barrier box as claimed in claim 2, wherein:
each of the fins comprises a bent portion, and the bent portion is connected to the mounting bottom plate by a removable fastening assembly such that the at least three fins are mounted on the mounting bottom plate.

8. The end barrier box as claimed in claim 7, wherein the removable fastening assembly comprises:
an insert member, wherein the insert member is mounted on the bent portion, the insert member comprises a U-shaped frame and a bolt, the bent portion has a hole, two ends of the U-shaped frame are mounted at two ends of the hole, and the bolt is mounted on a top of the U-shaped frame and has a tongue extending toward a direction of the hole; and
a receiving member, wherein the receiving member is mounted on the mounting bottom plate, the receiving member comprises a boss, the boss is provided with a receiving slot, and the boss is used for passing through the hole such that the receiving slot receives the tongue of the bolt.

9. The end barrier box as claimed in claim 8, wherein:
the receiving member comprises an elastic member and a ball, the ball is disposed at one end of the elastic member, the elastic member and the ball are disposed on two sides of the receiving slot, and the ball is used for elastic contact with a side surface of the tongue.

10. A reflow oven, comprising:
at least two guide rails; and
the end barrier box as claimed in claim 1 disposed at an inlet end and an outlet end of the reflow oven, wherein the end barrier box is disposed below the at least two guide rails.

11. An end barrier box for blocking ambient gases from entering a hearth of a reflow oven, comprising:
a box body, wherein the box body comprises a bottom, the bottom has a mounting bottom plate, the box body forms a top opening, the box body further comprises a pair of side walls, and the side walls are oppositely disposed; and
a plurality of deflectors, wherein each of the plurality of deflectors is mounted between the pair of side walls, each of the plurality of deflectors comprises at least three fins, and the at least three fins are mounted on the mounting bottom plate and extend upward from the mounting bottom plate;
the end barrier box is assembled below at least two guide rails of the reflow oven, and a first width is included between the adjacent guide rails of the at least two guide rails;
a second width is included between one guide rail of the at least two guide rails and the corresponding side wall;
a third width is included between the other guide rail of the at least two guide rails and the corresponding side wall; and
at least one fin of the at least three fins has a width smaller than at least one width of the first width, the second width and the third width such that at least one fin of the at least three fins is removable from the top opening.

12. The end barrier box as claimed in claim 11, wherein:
a width of the plurality of deflectors is the same as a width between the pair of side walls.

13. The end barrier box as claimed in claim 11, wherein:
the at least three fins are four fins.

14. The end barrier box as claimed in claim 11, wherein:
a gap is formed between the adjacent deflectors of the plurality of deflectors to form a gas passage.

15. The end barrier box as claimed in claim 14, wherein:
the mounting bottom plate is provided with a plurality of vent holes, and the plurality of vent holes are in communication with the gas passage.

16. The end barrier box as claimed in claim 11, wherein:
each of the fins comprises a bent portion, and the bent portion is connected to the mounting bottom plate by a removable fastening assembly such that the at least three fins are mounted on the mounting bottom plate.

17. The end barrier box as claimed in claim 16, wherein the removable fastening assembly comprises:
an insert member, wherein the insert member is mounted on the bent portion, the insert member comprises a U-shaped frame and a bolt, the bent portion has a hole, two ends of the U-shaped frame are mounted at two ends of the hole, and the bolt is mounted on a top of the U-shaped frame and has a tongue extending toward a direction of the hole; and
a receiving member, wherein the receiving member is mounted on the mounting bottom plate, the receiving member comprises a boss, the boss is provided with a receiving slot, and the boss is used for passing through the hole such that the receiving slot receives the tongue of the bolt.

18. The end barrier box as claimed in claim 17, wherein:
the receiving member comprises an elastic member and a ball, the ball is disposed at one end of the elastic member, the elastic member and the ball are disposed on two sides of the receiving slot, and the ball is used for elastic contact with a side surface of the tongue.

19. A reflow oven, comprising:
at least two guide rails; and
the end barrier box as claimed in claim 11 disposed at an inlet end and an outlet end of the reflow oven, wherein the end barrier box is disposed below the at least two guide rails.

* * * * *